A. BECKERS.
Stereoscope.
No. 26,407.
Patented Dec. 13, 1859.
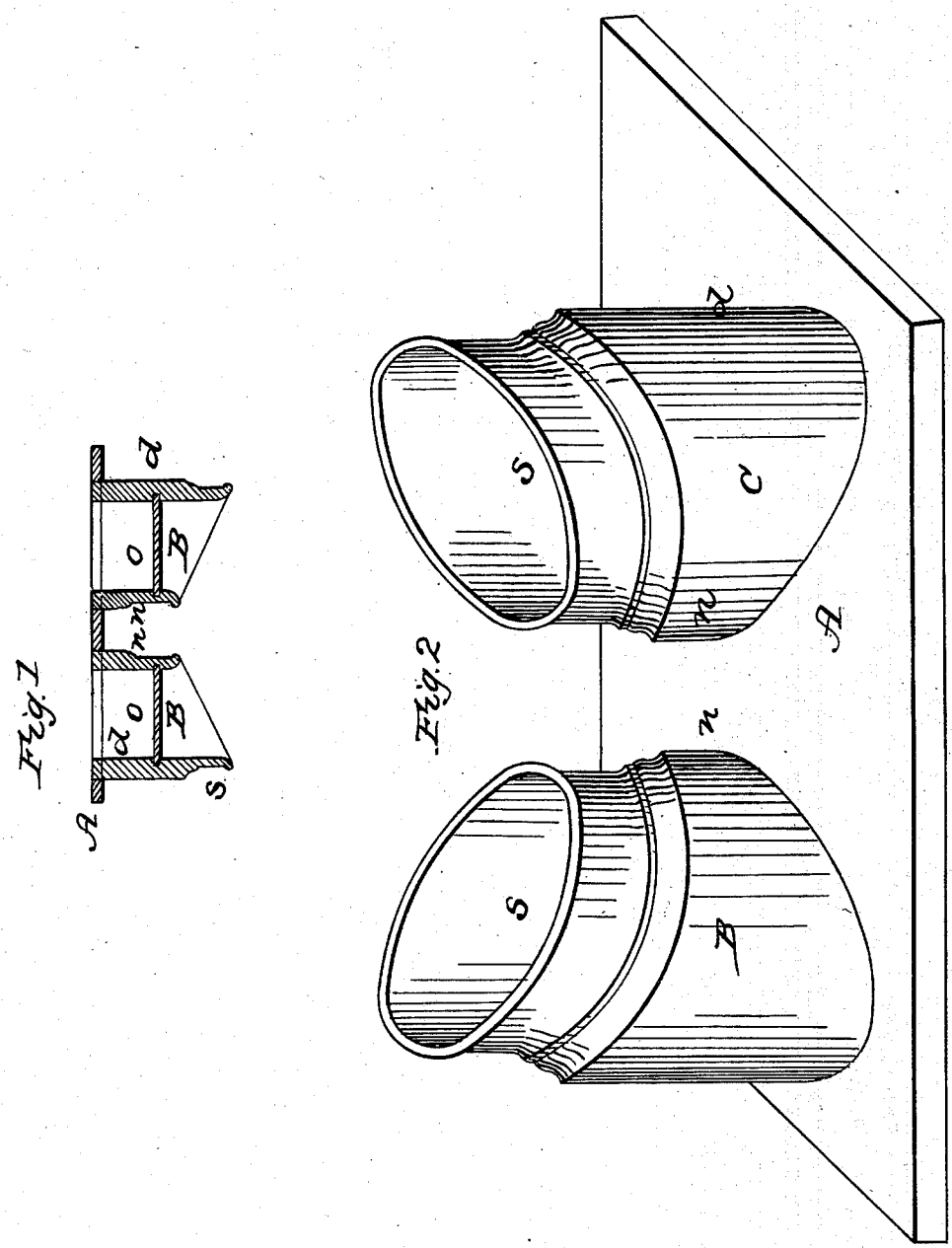
Witnesses
Charles Wehle
Julius Wehle
Inventor
Alex Beckers.

UNITED STATES PATENT OFFICE.

ALEXANDER BECKERS, OF NEW YORK, N. Y.

DOUBLE EYEPIECE FOR OPTICAL INSTRUMENTS.

Specification of Letters Patent No. 26,407, dated December 13, 1859.

*To all whom it may concern:*

Be it known that I, ALEXANDER BECKERS, of the city, county, and State of New York, have invented a new and useful Improvement in Double Sight-Tubes, Eye-Tubes, or Eyepieces for Stereoscopic and other Optical Instruments; and I do hereby declare the following to be a full and exact description of the same, reference being had to the annexed drawings, making part of this specification, in which—

Figure 1, is a longitudinal section. Fig. 2, a perspective view of my improvement.

The same letters of reference mark the same parts in these figures.

In order to protect the eyes against being affected by rays of light on the sides various devices are adopted. In spectacles movable side plates are sometimes used. In stereoscopic instruments movable separate side shields or shades are adopted which are connected with eye tubes of the usual form in such a manner as to form the higher portion on the outside when the said shades are elevated.

My invention consists in connecting stereoscopic or other optical instruments with double eye tubes sight tubes or eye pieces, each of which being turned of one piece in the shape of an obliquely intersected hollow cylinder in such a manner that the outside should be the highest and fit the surrounding parts of the eye.

To enable others skilled in the art to make and use my invention I will proceed to describe its construction and operation.

A represents the outside plate of the stereoscopic or other instrument to which the sight tubes, eye tubes or eye pieces are attached.

B and C represent the two sight tubes, the axis of each of which is perpendicular to the plate A.

O, O represent the respective eyeglasses of the sight tubes, the same being as usual parallel to the plate A.

The mantle of each tube or cylinder is higher on $d$ toward the outside of both tubes than on $n$ where the tubes stand nearest. Each tube is turned of one piece and represents a hollow cylinder the lower part of which is cut perpendicular to its axis, and the upper part of which is intersected obliquely to its axis. The ellipses resulting from the oblique section are turned with a beaded mold $s$, in order to prevent the face from being hurt when the said ellipses are pressed toward the same. The angle of the said oblique section is about 25 degrees and the tubes are so arranged on the plate A that their lowest parts $n$ and $n$ should be near together. The lower parts of the tubes may be ornamented by moldings as represented in the drawing or in any other suitable manner. The advantage of this construction consists in having the shield or shade and the tube united in one piece.

The tubes B and C are so arranged on the plate A, that each may be turned in its respective opening of the plate, thus they may be turned so as to fit to every face, by placing their lowest parts $n$, $n$ in greater or lesser proximity.

What I claim as new and desire to secure by Letters Patent is—

Connecting stereoscopic or other optical instruments with double eye tubes sight tubes or eye pieces each of which being shaped or turned of one piece in the form of an obliquely intersected and molded hollow cylinder substantially in the manner and for the purpose as described.

Dated New York November 11, 1859.

ALEX. BECKERS.

Witnesses:
CHARLES MEHLE,
JULIUS MEHLE.